United States Patent [19]
Van Schoyck

[11] 3,775,954
[45] Dec. 4, 1973

[54] METHOD AND APPARATUS FOR FACILITATING THE HARVESTING OF FRUIT FROM FRUIT TREES

[75] Inventor: Quentin H. Van Schoyck, Christmas, Fla.

[73] Assignee: Cylpik Incorporated, Winter Park, Fla.

[22] Filed: Jan. 4, 1973

[21] Appl. No.: 321,013

[52] U.S. Cl.................... 56/329, 56/DIG. 2, 182/68
[51] Int. Cl............................................. A01g 19/06
[58] Field of Search ..................... 56/328 R, 328 TS, 56/329, DIG. 2; 182/63, 68, 129, 131

[56] References Cited
UNITED STATES PATENTS
| | | | |
|---|---|---|---|
| 3,407,582 | 10/1968 | Poehlmann | 56/329 |
| 2,519,678 | 8/1950 | MacKenzie | 56/329 |
| 3,347,032 | 10/1967 | Pool et al. | 56/329 |

*Primary Examiner*—Louis G. Mancene
*Assistant Examiner*—J. N. Eskovitz
*Attorney*—Bradford E. Kile

[57] ABSTRACT

An apparatus for facilitating the harvesting of fruit from fruit trees including support means operably positionable adjacent to a fruit tree. The apparatus comprises support means including a first arcuate platform and a second arcuate platform which may be operably combined to form a generally semicircular platform for at least partially surrounding the periphery of a fruit tree. A conveyor is connected at one end thereof to the support means and is operably positionable at the other end thereof adjacent to the base of the fruit tree at a horizontal elevation less than that of the first and second arcuate platforms. A collection means is operably extendible between the arcuate platforms and the other end of the conveyor positionable adjacent the base of the fruit tree whereby fruit dropped into the collection means may be funneled by gravity into the other end of the conveyor for delivery away from the fruit tree.

A method for facilitating the harvesting of fruit from fruit trees comprising the steps of positioning a support adjacent to a fruit tree, extending a conveyor from the support to the base of the fruit tree and deploying collection means between the inner periphery of the support and the end of the conveyor adjacent the fruit tree.

24 Claims, 10 Drawing Figures

3,775,954
SHEET 1 OF 4
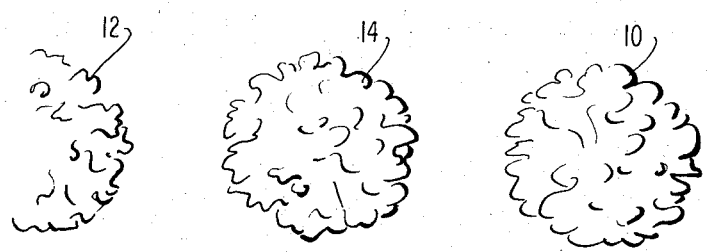
FIG. 1
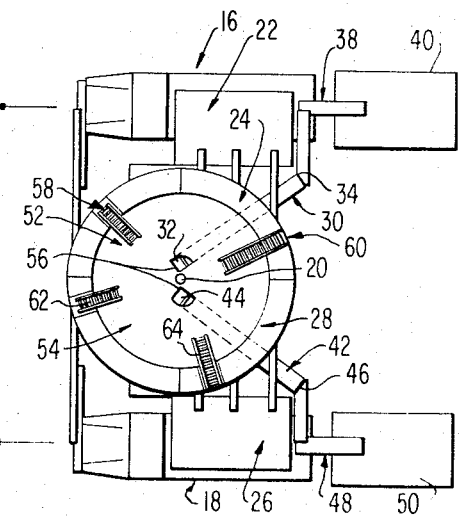
FIG. 8
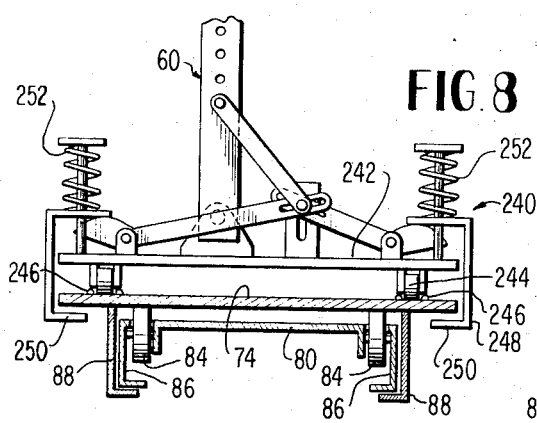
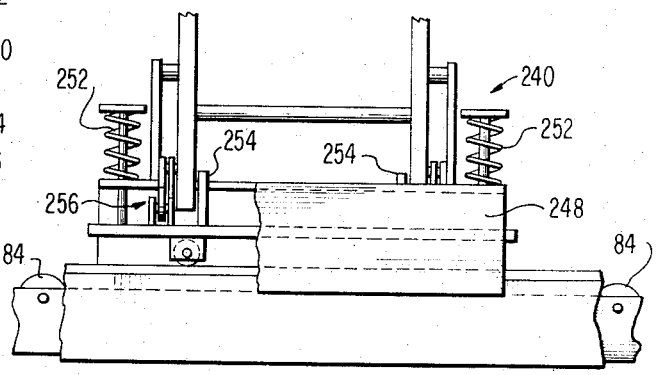
FIG. 10
FIG. 9
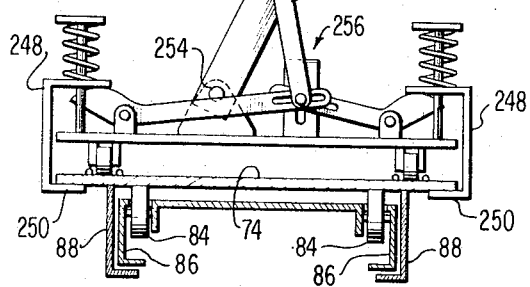
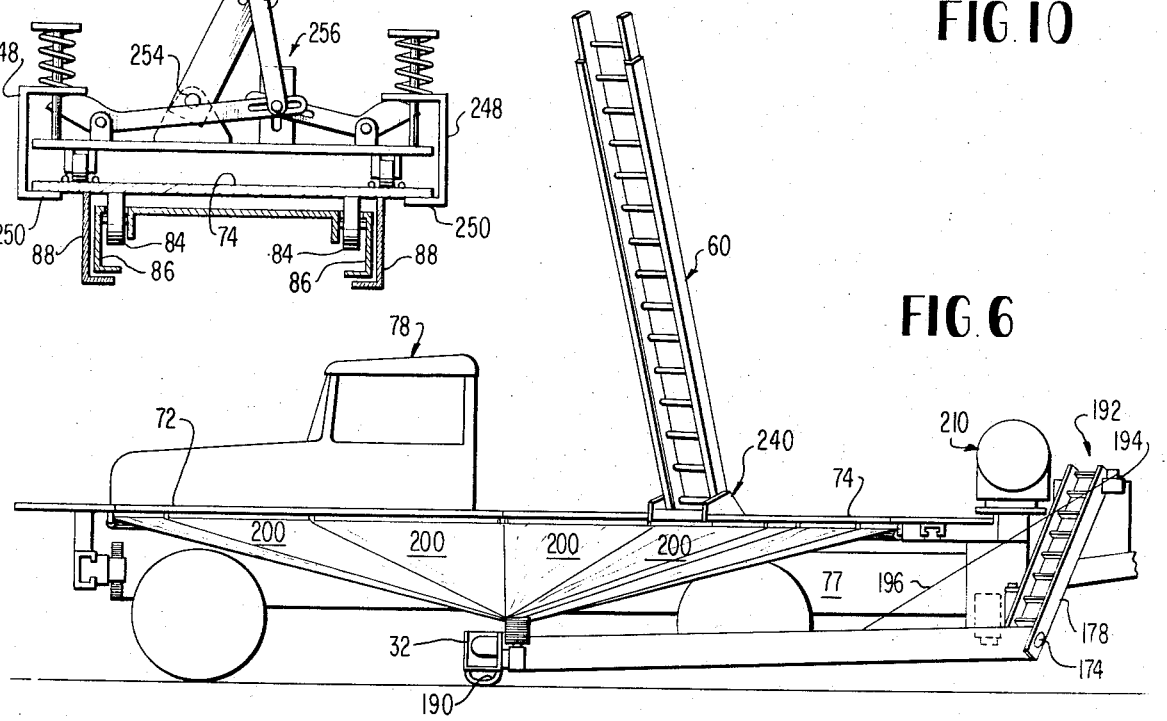
FIG. 6

PATENTED DEC 4 1973

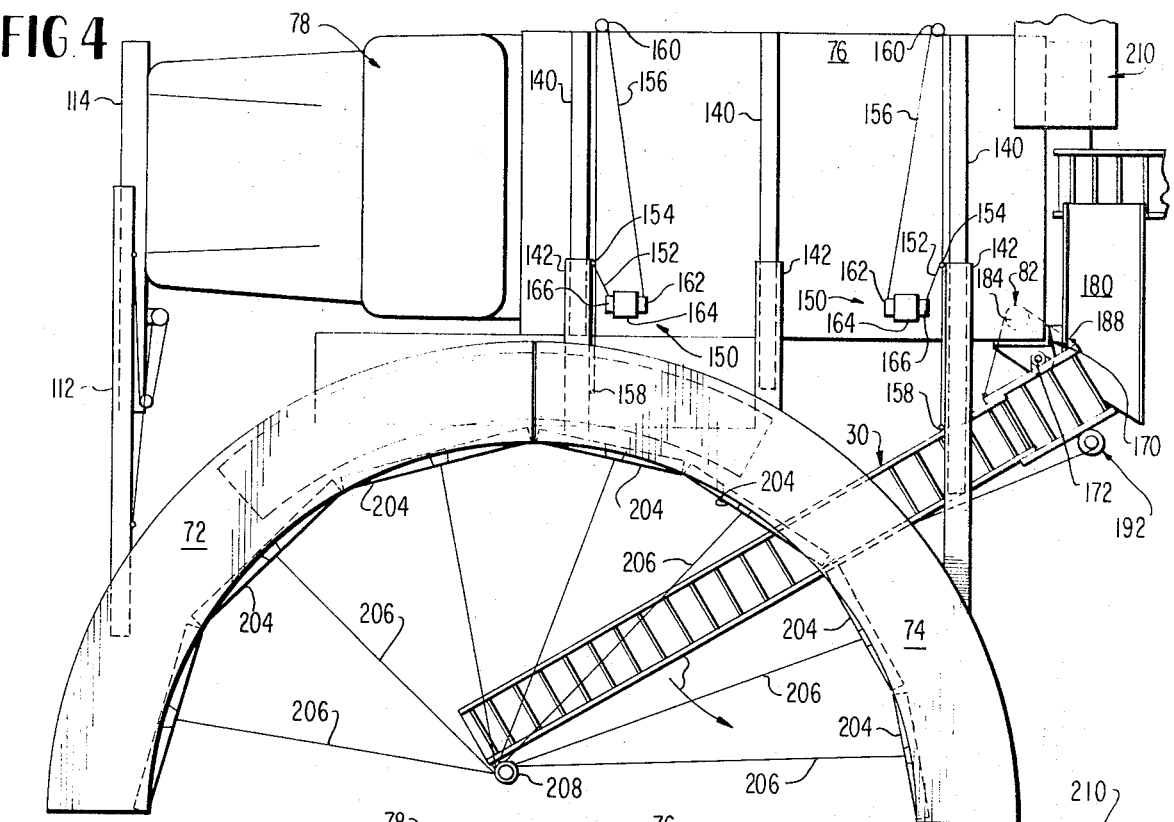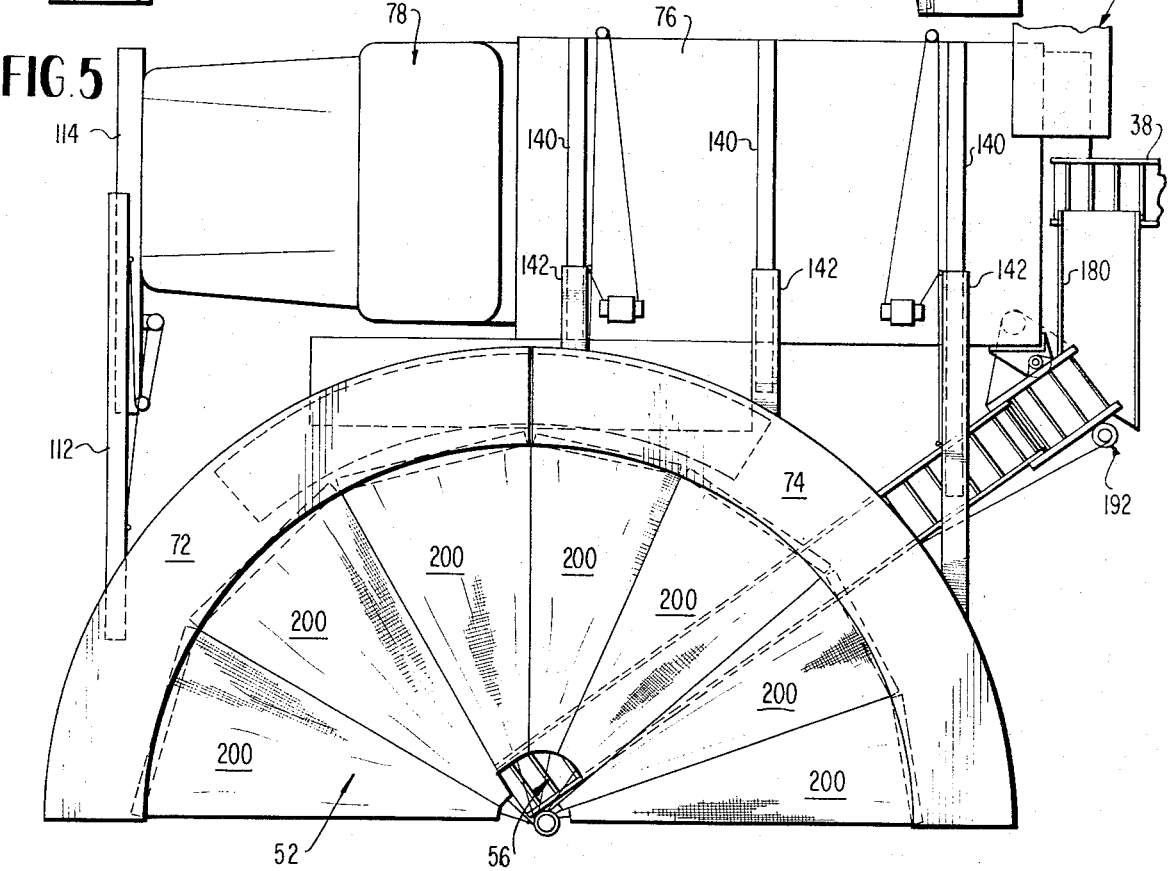

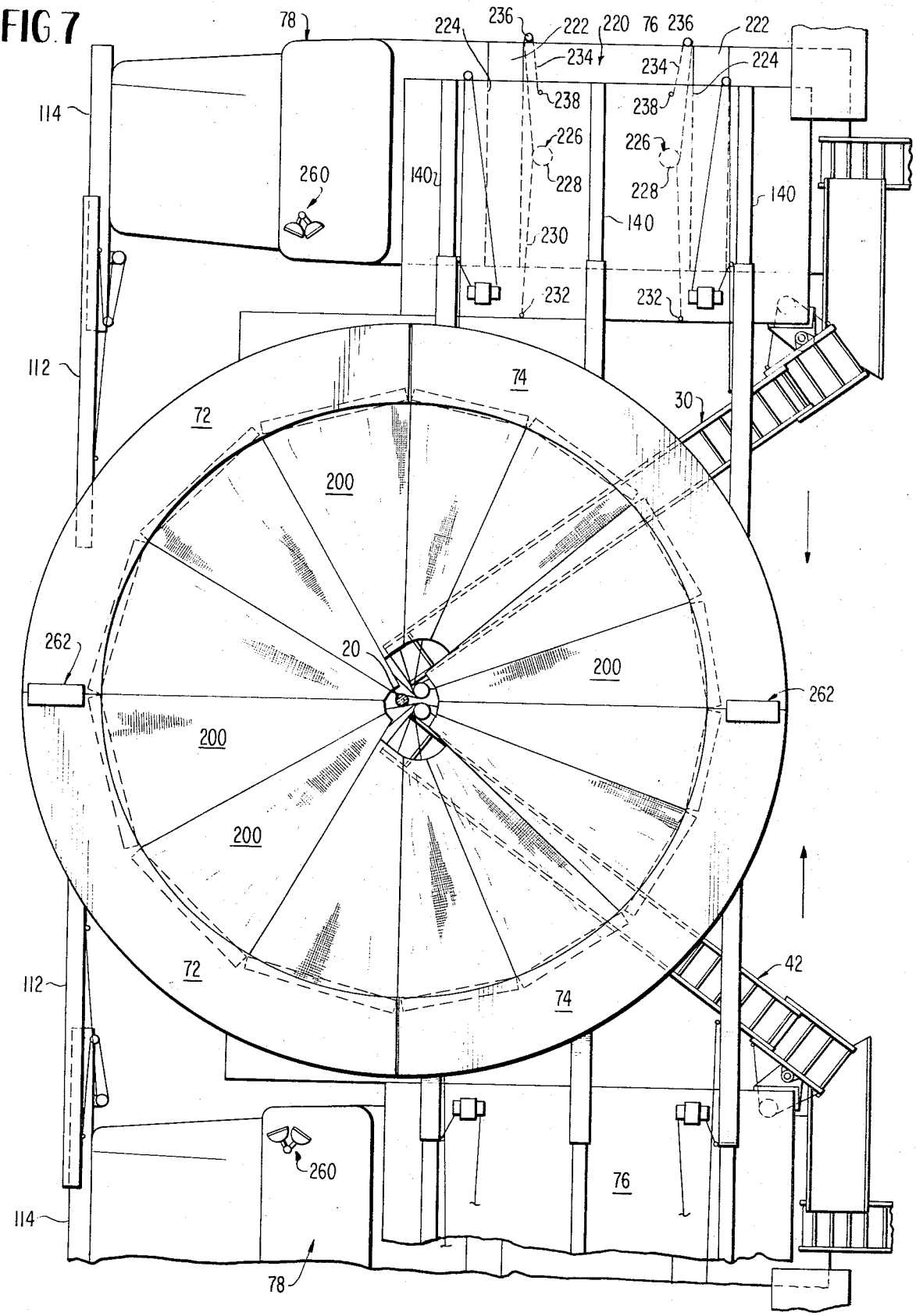

METHOD AND APPARATUS FOR FACILITATING THE HARVESTING OF FRUIT FROM FRUIT TREES

BACKGROUND OF THE INVENTION

The invention pertains to a method and apparatus for facilitating the harvesting of fruit from fruit trees. More particularly the invention relates to a method and apparatus for facilitating the harvesting of citrus fruit for the "juice" market.

In the United States the principal citrus growing regions are Florida and California. California produces thick-skinned naval oranges which ripen during the winter and spring months and are sold primarily as fresh whole fruit. On the other hand, Florida produces sweet, thin-skinned juicy oranges which ripen in early winter and are sold primarily to produce orange juice.

In the juice industry it is desirable to leave fresh fruit on the trees as long as possible in order to maximize the juice and sugar content of the fruit prior to harvesting. The longer the fruit is left on the tree to ripen, however, the more likely the fruit is to drop onto the ground and decay.

More specifically it will be appreciated that fruit from tree to tree and even fruit on a single tree does not ripen in a completely uniform manner. In this connection some of the individual oranges may become completely ripe, and the junction of the stem with the orange may become substantially weakened, while the average ripening state of oranges on the tree is just approaching ideal conditions for harvesting.

From the foregoing it will be realized that in order to minimize the possibility of losing the most mature oranges while maximizing the average sugar content of the fruit, it is highly critical to quickly harvest the fruit once a desirable average sugar content is reached. Moreover the criticality of a short harvesting time frame may be further appreciated when the potential of adverse weather conditions is considered. In this connection, a wind or rain storm may have a devastating effect on heavily laden fruit trees in terms of breaking branches and also "showering" ripened fruit onto the ground.

A still further aspect in connection with harvesting "juice" fruit is, as previously mentioned, the fact that normal harvesting takes place in November and December. A snap freeze during this period may at least partially freeze the ripened fruit. Notwithstanding, however, such a freeze it may still be possible to save a substantial portion of a crop if the fruit is harvested and processed quickly enough.

In sum it will be appreciated that speed of harvesting is a high critical factor in the juice industry.

A first known technique for harvesting fruit from citrus trees was to lean a ladder against the tree, climb the tree with a sack and manually remove the fruit. It will readily be realized, however, that such a process is time consuming, extremely laborious in terms of climbing up and down a ladder while carrying a heavy sack of fruit, and also physically demanding in terms of manipulating the ladder about the tree. In this regard some Florida seedling trees may reach a height of 30 to 35 feet. A ladder long enough to be of utility in connection with such trees is extremely awkward to manipulate and tends to be unstable when a picker tries to remove fruit from the uppermost branches. As a consequence, many laborers refuse to work in orchards which are composed of or include seedling trees. Even in orchards of smaller trees the difficulty of handling and the danger of utilizing an unstabilized ladder tends to eliminate women and youths from the working force.

In the past, several techniques have been at least theorized in an attempt to take the laborer out of the tree. One such device comprises a mechanical shaker which is operable to grasp a tree trunk and physically shake the tree so that the fruit "showers" onto the ground. Laborers then pick the fruit up and throw it into a tractor pulled wagon. Such a technique, however, increases the possibility that the laborers will unwittingly pick up decayed and rotten fruit from the ground and thus mix bad fruit with the good. Further, the mechanical device which shakes the trees tends to damage the tree bark and disturb the root system.

A further known technique comprises blowing fluid, such as compressed gas or water, into the tree to knock fruit onto the ground. Such a system suffers from the previous noted disadvantage of mixing rotten and usable fruit and also is potentially damaging to the limbs of the fruit tree which are heavily laden with fruit.

A still further disadvanatage which is common to both of these previously known mechanical devices is that some of the fruit in the tree which is not completely mature will tend to tenaciously cling to the branches and thus remain unharvested.

In addition to the foregoing described mechanized devices various platform systems have been designed for use in connection with the harvesting of fruit for the whole fruit market. In this connection such systems have been designed to minimize bruising whole fruit during harvesting. Such systems, however, are not sufficiently beneficial in terms of time saving in harvesting fruit for the juice market, where rapid processing eliminates bruising as a major consideration, to warrant the expenditure of capital to purchase and maintain the equipment.

Therefore, notwithstanding the long and hard felt need to facilitate harvesting juice fruit and repeated attempts to mechanize the process, the standard harvesting technique in the Florida juice industry remains to employ laborers using individual ladders and sacks for manually picking fruit in a manner substantially unchanged from the time the industry began.

OBJECTS OF THE INVENTION

Objects

It is therefore a general object of the invention to provide a novel method and apparatus for facilitating the harvesting of fruit from fruit trees which will obviate or minimize problems of the type previously described.

It is a particular object of the invention to provide a novel method and apparatus for facilitating the speed at which citrus fruit may be harvested for the juice industry.

It is a further object of the invention to provide a novel method and apparatus for facilitating the harvesting of fruit from fruit trees which will minimize the strength requirements necessary to harvest the fruit.

It is yet a further object of the invention to provide a novel method and apparatus for facilitating the harvesting of fruit from fruit trees which increases the safety of the harvesting operation.

It is still a further object of the invention to provide a novel method and apparatus for facilitating the harvesting of fruit from fruit trees wherein a picker is not required to lift or carry a ladder, carry a sack, or precariously climb an unstabilized ladder.

It is yet still a further object of the invention to provide a novel method and apparatus for facilitating the harvesting of fruit from fruit trees which enables a picker to utilize both hands for expeditiously removing fruit from the tree.

It is another object of the invention to provide a novel method and apparatus for facilitatng the harvesting of fruit from fruit trees which is economical to manufacture and is easily serviceable.

It is still another object of the invention to provide a novel method and apparatus for facilitating the harvesting of fruit from fruit trees which is mobile and may be readily positioned adjacent succeeding trees in a row of trees in a fruit orchard and which may be readily moved from orchard to orchard.

It is still another object of the invention to provide a novel method and apparatus for facilitating the harvesting of fruit from trees which is mechanically deployable adjacent and beneath a tree for harvesting fruit from the tree and mechanically retractable for mobility.

BRIEF SUMMARY

A method and apparatus intended to accomplish at least some of the foregoing objects comprises a support means operably positionable adjacent to a fruit tree which includes a first arcuate platform and a second arcuate platform, which when operably positioned adjacent the fruit tree forms a generally semicircular platform at least partially surrounding the tree. A conveyor is connected at a first end, remote from the fruit tree, to the support and is operably positionable at a secondary end thereof adjacent the base of the fruit tree at a horizontal elevation less than the elevation of the first and second arcuate platform. A collection means is operably extendible between the first and second arcuate platform means and the second end of the conveyor means for collecting, by gravity, fruit removed from the fruit tree and delivering the fruit onto the second end of the conveyor for removing and harvesting.

A method according to a preferred embodiment of the invention includes the steps of positioning a support adjacent to a fruit tree including the steps of positioning a first arcuate platform above a ground surface adjacent the fruit tree and a second arcuate platform above the ground surface adjacent the fruit tree for operably forming a generally semicircular platform at least partially around the periphery of the fruit tree. The method further includes the steps of extending a second end of a conveyor, having a first end thereof connected to the support, against the base of the fruit tree generally adjacent the ground surface and deploying collection means between the inner periphery of the first and second arcuate platform means and the second end of the conveyor to provide a means to collect fruit dropped from the fruit tree and for feeding the fruit onto the conveyor for removal and harvesting.

THE DRAWINGS

Other objects and advantages of the present invention will become apparant from the following detailed description taken in conjunction with the accompanying drawings wherein:

FIG. 1 is a plan schematic view of an apparatus according to a preferred embodiment of the invention, for facilitating the harvesting of fruit from fruit trees positioned in a posture encompassing a tree along a row of trees in a fruit orchard;

FIG. 2, note sheet 2, is a detailed plan view of an embodiment of the subject invention disclosing first and second arcuate platform segments and a conveyor means in a retracted position on a mobile frame to facilitate transportation;

FIG. 4 is a plan view of the subject invention according to a preferred embodiment wherein the first and second arcuate platform segments are extended to form in combination a generally semicircular platform and the one end of the conveyor is swung away from the mobile frame with a plurality of guide lines extending between the free end of the conveyor and a plurality of flexible sheet rolls;

FIG. 5 is similar to FIG. 4 and specifically discloses the deployment of a plurality of flexible sheets to form a semicircular collection assembly between the inner periphery of the first and second arcuate platforms and the free end of the conveyor means;

Figure 2:
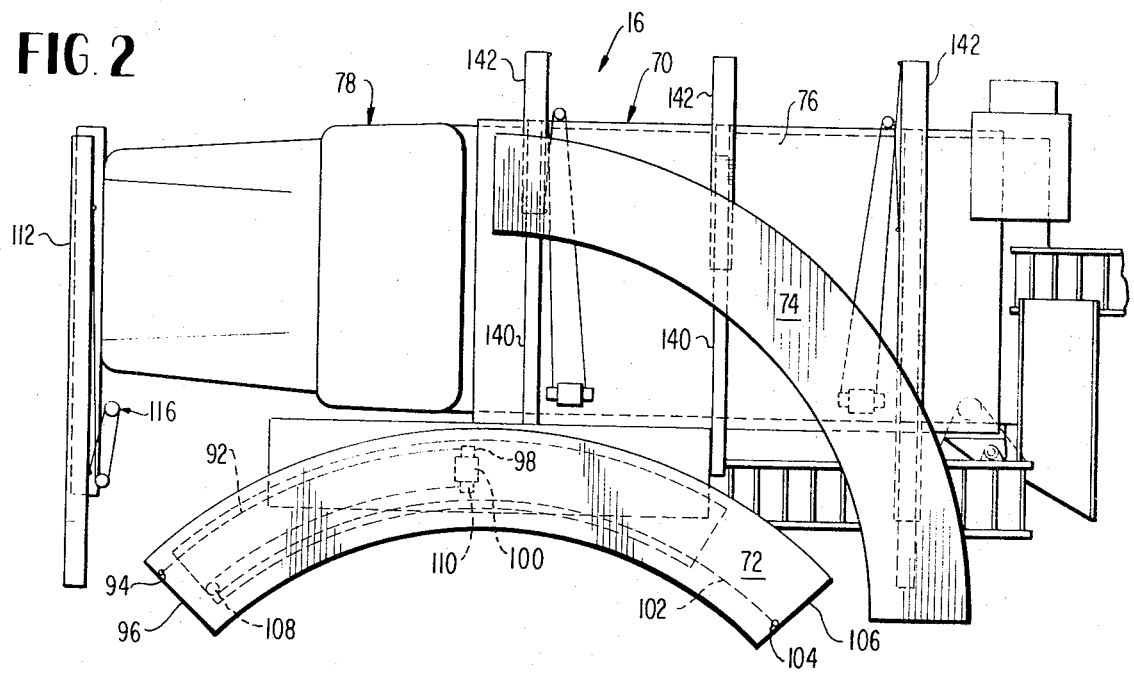

FIG. 6, note sheet 1, is a side elevational view of the subject fruit harvesting apparatus including at least one ladder operably positionable upon the arcuate platform means;

FIG. 7 discloses a detailed plan view of a pair of complementary fruit picking units according to a preferred embodiment of the invention, including right and left hand semicircular platforms operable to essentially encircle the outer circumference of a fruit tree;

FIG. 8 is a detailed side elevational view of a ladder base and locking assembly in a normal posture for adjustable movement upon the platform;

FIG. 9 is a detailed side elevational view of the ladder base and locking assembly in an actuated locked posture, operative to stably support a fruit picker; and FIG. 10 is a side view of the ladder base and lock assembly partially broken away to disclose the linkage assembly utilized to lock the base with respect to the supporting platform.

DETAILED DESCRIPTION

General Assembly

Turning now to the drawings wherein like numerals designate like parts, and particularly to FIG. 1 thereof, there will be seen a plurality of fruit trees 10 and 12 aligned in a row on 25 foot centers. This spacing is typical in the Florida citrus industry. In some orchards an intermediate tree 14 may be positioned between the trees 10 and 12 in order to double the number of trees per row and thus reduce the centers to 12.5 feet.

As shown on the right hand portion of FIG. 1, there will be seen schematic views of a right hand mobile unit 16 and a complemental left hand mobile unit 18 which is operable to move successively along the rows of trees and into substantial alignment on opposite sides of each of the fruit trees in the row. In this connection, the right and left hand complemental units are depicted in a posture positioned about the trunk 20 of a fruit tree. The right hand mobile unit 16 carries a retractable assembly 22, operable to support a right hand generally semicircular platform 24. In like manner the left hand mobile unit 18 is operable to carry a retractable assembly 26 which is operable to support a left hand generally semicircular platform 28.

The right hand mobile unit 16 further carries a retractable conveyor 30 having a distal end 32 which is operable to be positioned against the base 20 of the fruit tree. At the proximal end 34 the conveyor empties into a further conveyor assembly 38 which in turn feeds into a wagon 40 drawn by the mobile unit 16. In a similar manner the left hand mobile unit 18 is provided with a conveyor 42 having a distal end 44 thereof operably positionable against the trunk 20 of a fruit tree. At the proximal end 46 the conveyor empties into a further conveyor assembly 48. The conveyor assembly 48 terminates above a wagon 50 which is articulated to the mobile unit 18.

Right hand retractable fruit collecting flexible sheets 52 extend between the inner periphery of the platform 24 and the trunk 20 of the fruit tree. In a similar manner, left hand retractable fruit collecting flexible sheets 54 extend between the inner periphery of the platform 28 and the base of the tree trunk 20. An aperture 56 is fashioned through each of the right and left hand flexible sheets 52 and 54, above the distal ends 32 and 34 of the conveyors 30 and 42, respectively.

A plurality of hand ladder means 58 and 60 are operably positioned for adjustability upon the right hand platform 24. Again in a similar manner, extendible ladder assemblies 62 and 64 are adjustably positioned upon the left hand platform 28. The ladder assemblies are operable to be inclined toward the periphery of a fruit bearing tree so that pickers may mount the ladders and knock fruit from the tree down into the right and left hand collecting sheets 52 and 54. The fruit will then gravitate through the apertures 58 into the conveyors 30 and 42 and will be automatically delivered to the wagons 40 and 50.

As previously mentioned, the right and left hand semicircular platform assemblies, right and left hand conveyors, and right and left hand flexible collecting sheets, are operably retractable away from the tree trunk 20 and toward the mobile units so that once a tree has been stripped of its fruit, the units may be independently transportable to a succeeding tree in a row and extended in a realigned posture about the outer periphery of the tree to facilitate rapid harvesting of fruit from an orchard.

The right and left hand units are mirror images and therefore a detailed discussion of the right hand unit 16 as specifically illustrated in FIGS. 2–6 will be fully applicable to the left hand unit 18.

ARCUATE PLATFORM ASSEMBLIES

With particular reference now to FIG. 2, there will be seen a support means 70. The support means includes a first arcuate platform 72 and a second arcuate platform 74. Arcuate platform 72 and 74 when extended adjacent the periphery of a fruit tree are operable to form a generally continuous semicircular platform 24 as previously discussed.

The support means 70 includes a generally rectangular frame 76 which is rendered mobile by being supported by longitudinally extending bed rails 77, note FIG. 6, of a conventional truck 78. While a self-propelled vehicle 78 has been specifically disclosed it will be appreciated by those skilled in the art that a wagon frame, or the like, operable to be pulled by a tractor will also be suitable although a self-propelled vehicle is preferred.

Figure 3:
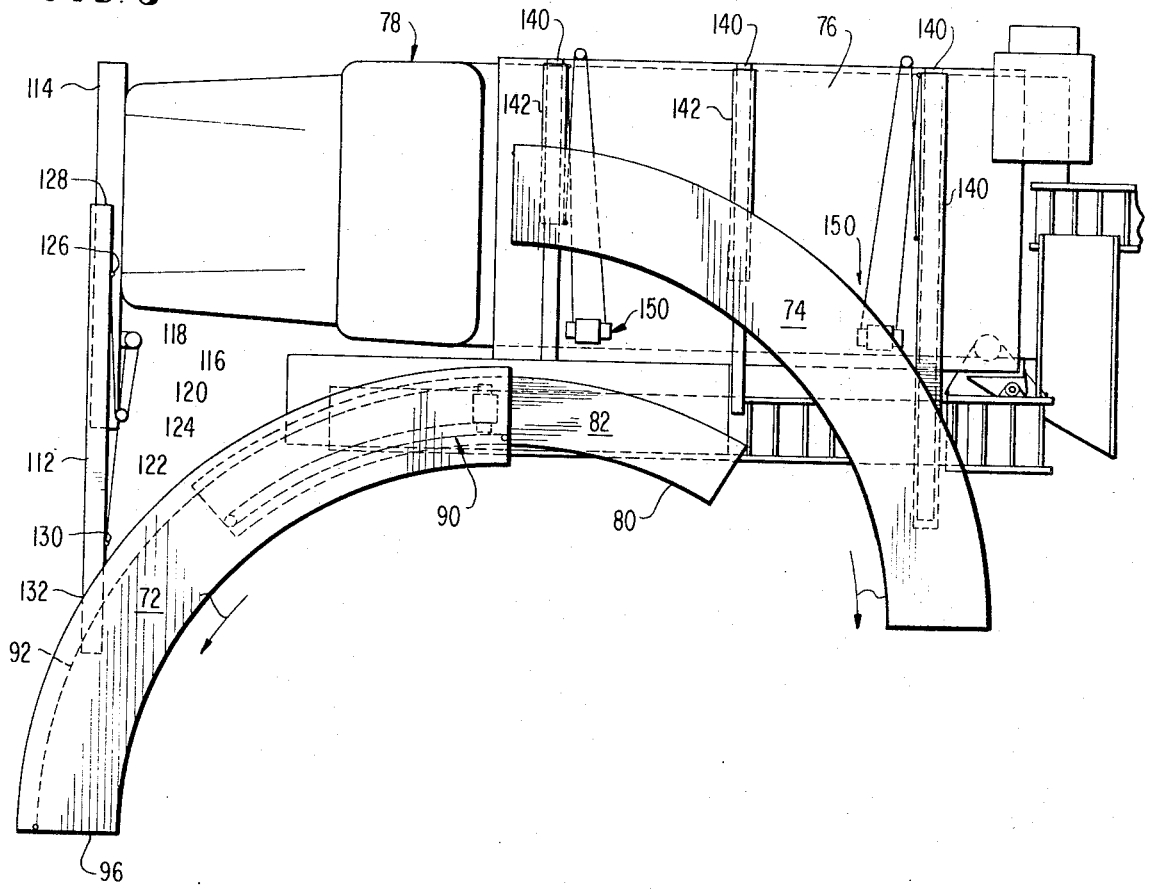
FIG. 3 is a detailed plan view similar in general character to FIG. 2 and specifically discloses telescoping movement of the first arcuate platform segment with respect to an arcuate guide.

The generally rectangular frame 76 includes an arcuate guide 80, note FIG. 3, fixedly attached thereto. The guide 80 is provided with an upper planar surface 82 which serves to slidingly support the arcuate extendible and retractable platform 72. In an alternate embodiment, note FIGS. 8–10, telescoping movement of the platform 72 with respect to the guide 80 is facilitated by the provision of a plurality of roller assemblies 84 mounted upon the guide 80.

Also as noted from FIGS. 8 and 9, it will be seen that the guide section 80 is provided with channel shaped edges 86 to increase the bending strength of the structure. In a similar fashion the platform 72 is provided with channel shaped edges 88 which are compatibly dimensioned with edges 86 to slidably surround and enhouse guide 80. Edges 88 thus serve to facilitate telescoping movement of the platform 72 with respect to the guide 80.

Actuation of the relative telescoping movement of the first arcuate platform 72 with respect to the arcuate guide 80 may be effected by a plurality of systems such as rack and pinion gear assemblies, hydraulic actuation assemblies, chain and sprocket assemblies and the like. It is preferred, however, to utilize a flexible cable and dual spool winch assembly 90, note FIGS. 2 and 3.

More specifically in this connection, a first flexible cable 92 is connected at 94 to one end 96 of the arcuate platform 72. Flexible cable 92 is trained through a U-shaped guide (not shown) mounted upon the guide 80 back to a take-up and pay-out spool 98 of a dual spool electric winch 100. A second flexible cable 102 is connected at 104 to the other end 106 of the arcuate platform 72 and is trained through a U-shaped guide (not shown) around a guide pulley 108 mounted at the end of the arcuate guide 82 adjacent the end 96 of the arcuate platform 72. The cable 102 is thus reversely directed to a second spool 110 of the winch 100.

When it is desired to extend the first arcuate platform 72 to a posture at least partially surrounding the periphery of a fruit tree, spool 110 is actuated to take up line 100 and thus pull the arcuate platform 72 counterclockwise relative to the guide 80 to a posture as viewed in FIG. 3. When fruit has been picked from the tree and it is desired to mechanically retract the first arcuate platform 72, the spool 98 is actuated and the flexible line 92 is wound onto the spool to telescope in a clockwise direction the first arcuate platform 72 inwardly upon the guide 80 to a position as illustrated in FIG. 2. Travel limits for the first arcuate platform 72 in the extended and retracted position may be provided by mechanical stops and/or limit switches (not shown) as desired.

Support for the end 96 of the first arcuate platform 72 may be provided with a portable leg assembly positioned at the outermost end thereof (not shown) or alternatively may be provided with a mechanically extendible and retractable cantilever arm 112. The arm 112 is supported upon a guide 114, which in turn is fixedly mounted to the front of the vehicle 78.

Actuation of the extendible guide 112 may be provided by a plurality of systems, but again, in a preferred embodiment a flexible line winch assembly 116 is utilized. The assembly 116 includes a winch 118 having a pair of spools with a first flexible line 120 connected to one spool and a second flexible line 122 connected to the other spool. Line 120 is reaved around a guide pulley 124 and is then connected at 126 at an inboard end 128 of the extendible support 112. The second flexible line 122 is extended toward and directly connected to, as at 130, the outboard end 132 of the extendible guide 112.

By actuation of the winch and flexible line assembly 116 in a manner as previously discussed in connection with assembly 90, the support 112 may be extended from a retracted posture as viewed in FIG. 2, to an extended supporting posture as illustrated in FIG. 3.

While the previously discussed first arcuate platform 72 is telescopingly extendible and retractable upon an arcuate guide 80, the second arcuate platform 74 is mounted for translatable movement generally laterally across the frame 76. In this connection a plurality of transverse guide rails 140 are mounted upon the frame 76. The guide rails 140 telescopingly receive support arms 142 which in turn are connected directly to the underframe of the second arcuate platform 74.

In order to mechanically actuate the second arcuate platform 74 from a retracted to an extended position and back again a plurality of systems may be utilized, as previously mentioned. However, a preferred system includes a pair of flexible cable and winch assemblies 150. Each winch assembly 150 is provided with a first flexible line 152 which is directly connectable, as at 154, to the inboard end of an adjacent support 142. A second flexible cable 156 is connected at one end directly to a lateral surface of an adjacent support 142, as at 158. The second flexible cable 156 is then reaved around a guide pully 160 and wrapped around a first spool 162 of a winch 164. The first line 152 in turn is connected to a second spool 166 of the winch 164.

In order to actuate the second arcuate platform 74 from a retracted posture as depicted in FIG. 3 to an extended posture as depicted in FIG. 4, the flexible line and winch assemblies 150 are operated in unison in a manner as previously discussed in connection with the telescopic extension and retraction of the first arcuate platform 72.

CONVEYOR ASSEMBLY

As previously discussed, the frame 76 is fitted with a retractable and extendible conveyor 30. In this connection a proximal end of the conveyor is pivotally connected directly to the frame 76, about a vertical pivot assembly 170 as at 172, note FIG. 4.

The conveyor 30 may be articulated, as at 174, note FIG. 6, into a first segment 176 which is operable to extend beneath low lying branches of a fruit tree and a more vertically inclined section 178 suitable to raise fruit high enough to be delivered onto a gravity slide 180. From the slide 180 the fruit rolls into a further conveyor 38 which is suitable to transfer the fruit to a wagon 140.

In order to pivot the conveyor 30 about the generally vertical pivot assembly 170, a further flexible wire rope winch assembly 182 is provided which includes a winch 184 and a first and second flexible line 186 and 188 respectively. The flexible line 188 is taken up by the winch in order to pivot the conveyor 30 away from the frame 76 as particularly illustrated in FIG. 4 and the line 186 is taken up in order to pivot the conveyor 30 into a retracted posture adjacent the frame 76 for transportation purposes.

Once the conveyor 30 has been swung outwardly to a posture against the base of a fruit tree, it is desirable to remove the load from the vertical pivot. In this connection the lower segment 176 may be pivoted about a generally horizontal axis as at 174, so that the distal end 32 of the conveyor may rest upon a ground surface supported by a generally U-shaped bracket 190.

This horizontal pivoting movement is provided by a winch assembly 192 which includes a winch 194 and a single wire line 196. In this connection, downward pivotal movement of the distal end 32 is achieved by gravity. However, when it is desired to raise the distal end of the conveyor to swing the conveyor 30 against the mobile frame for transportation the winch 194 is actuated which takes up line 196 and raises the conveyor.

The actual detailed construction of the segments 176 and 178 of the conveyor assembly 30 are entirely conventional and do not per se form a part of the invention. It will be noted, however, that the conveyor 30 is of the endless belt multiple flight type which is driven by an electric motor through a reducing gear (not shown).

COLLECTION ASSEMBLY

Once the first and second arcuate platforms 72 and 74 are extended to a posture to at least partially surround the outer periphery of a fruit bearing tree and the conveyor 30 is positioned beneath the tree with a distal end thereof adjacent the trunk of the tree, note FIG. 4, it is next desirable to deploy a collecting assembly 52 beneath the tree.

The collecting assembly may assume many forms but in a preferred embodiment comprises a plurality of flexible sheets 200 operable to be extended from a stored position, note FIG. 4, to a deployed posture, note FIG. 5, with an aperture 56 above the diatal end 32 of the conveyor 30. Therefore, fruit dropped within the inner periphery of the semicircular platform will tend to roll by gravity upon the flexible sheets 200, which form a generally inverted cone, note FIG. 6, to the apex of the cone and onto the conveyor 30 for removal to a wagon 40.

As previously mentioned the specific structural arrangement and mode of storing and deployment of the flexible sheets may comprise a plurality of specific designs and forms, however, at least one design operable in accordance with the present invention comprises a plurality of spring loaded roller assemblies 204 which are mounted upon the underframe of the inner periphery of the first and second arcuate platform segments 72 and 74. A flexible line 206 extends from each of the frames 204 and is directly connected to the apex of a triangular shaped flexible sheet 200. Deployment of the individual sheets 200 is achieved by a takeup winch 208 which may be mounted at the distal end of the conveyor 30. In order to retract the sheets the lines 206 are payed out and the spring loaded roller assemblies 204 roll the sheets up into a stowed posture.

The composition of the flexible sheets 200 may range from a pliable cotton fabric or synthetic fiber to a thin metallic sheet. A common denominator, however, for the various materials which are suitable for use in connection with the sheets 200 is that they possess sufficient flexibility to be compactly stowed in combination with sufficient strength to support fruit dropped from a tree during a harvesting operation.

FINAL ADJUSTMENT ASSEMBLY

In order to provide a degree of adjustability to permit the operator of the mobile vehicle 78 a range of permissible error in exact alignment with respect to the fruit trees, the generally rectangular frame 76 which carries guide rails 140 is in turn carried by an underlying support 220 having transversely extending guide surfaces 222 which are compatibly mated with channel runners 224 fashioned within the underframe of the support 76.

Translation of the frame 76 with respect to the support 220 is again provided by a plurality of flexible wire and winch assemblies 226. Each of the assemblies 226 includes an electrically actuable winch 228 having dual spools and a first flexible line 230 which is connected to an outer edge of the frame 76 as at 232. A second flexible line 234 is reaved around a guide pulley 236 and then connected to an underlying surface of the frame 76 as at 238.

Therefore, and as previously discussed, appropriate actuation of the flexible line and winch assemblies 226 which are electric powered will serve to translate the frame 76 with respect to the underlying frame 220 inwardly and outwardly with respect to the truck 78.

ADJUSTABLE LADDER ASSEMBLY

Referring now specifically to FIGS. 6, 8, 9 and 10, there will be seen a ladder assembly 60 operable to facilitate the removal of fruit from fruit trees by laborers. In this connection the ladder may be extensible and thus operable to reach high into the tallest seedling trees to permit a picker to remove the fruit. The ladder is stabilized by a base assembly 240 which is designed for lateral adjustability and locking in a manner to be discussed in detail.

In this connection the base assemblies 240 are comprised of a generally rectangular platform 242 which is adapted to ride upon roller assemblies 244 which in turn rest upon the upper surface of the arcuate platforms 72 and 74. In order to maintain the base 242 in alignment upon the arcuate platforms, raised rails 246 may be welded to the platform surface to guide the wheel assemblies 244. Stability is further provided by U-frame assemblies 248 which enclose the outer peripheral edges of the base 242 and the arcuate platforms 72 and 74.

As shown in FIG. 8, lower arms 250 of the U-frame assemblies 248 are normally maintained in a disengaged posture with respect to the under surface of the arcuate platforms by the provision of biasing assemblies 252. In this posture an operator may effortlessly translate the ladder and base assembly about the periphery of the platform to a location at the fruit tree suitable for picking the fruit.

Once a desired location is reached, the ladder 60 is merely pivoted forward, note arrow A in FIg. 9, about a base pivot bracket 254. A linkage assembly 256 is provided having a first arm 258 adjustably connectable to the rails of the adjustable ladder in a plurality of locations by conventional threaded fasteners or the like. Through the lever assembly 256 pivoting movement of the ladder in the direction of arrow A will effectuate the upward movement of the channel frames 248 until the lowermost legs thereof 250 abuttingly engage against the lower surface of the platforms. In this posture the ladder base assembly 240 is locked into a completely stationary posture with respect to the platform. Various angles of inward inclination may be achieved merely be adjusting the connecting point of arm 258 with the ladder rails.

POWER ASSEMBLY

As previously discussed, a plurality of electric winches have been utilized in connection with the subject system to provide motive force for the various movable assemblies. The electricity for each of these previously described winches may be generated by an internal combustion engine generator unit 210 which may be carried by the frame 76.

Further since the subject invention essentially takes the laborious work out of fruit picking a two shift around the clock operation is feasible. In this connection the generator 210 is also suitable to supply power to one or more light assemblies 260, note FIG. 7, which may be utilized for night operation.

PROCESS

The foregoing described apparatus may be advantageously utilized to harvest fruit from fruit trees in a manner substantially as follows. Right hand and left hand units 16 and 18 are generally aligned adjacent to the outer periphery of a fruit tree, note particularly FIGS. 1 and 7. The first arcuate platform members 72 are telescoped about the outer periphery of the tree and the second arcuate platform member 74 are translated into adjacency with the first arcuate platform members 72 to form in combination generally semicircular structures extending peripherally about the tree. At the outer ends of the abutting platforms hinge amount flaps 262 are provided to facilitate movement completely around the fruit tree.

The conveyors 30 and 42 are then pivoted about generally vertical axes away from the mobile frames and into adjacency with the trunk 20 of a fruit tree. The lower sections 176 of the conveyors are then pivoted about generally horizontal axes to lower the sections upon a ground surface adjacent the base of the tree.

The next step comprises extending a collection means comprising a plurality of flexible sheets beneath the boughs of the fruit trees and down to the distal ends of the conveyors. As previously discussed, the flexible sheets are provided with apertures so that fruit deposited thereupon will fall by gravity into the conveyors 30 and 42 for conveyance away from the tree and into wagons 40 and 50.

Fruit pickers then adjust the ladder assemblies 58, 60, 62 and 64 into appropriate positions for facilitating harvesting. In this connection once the ladders are adjustably positioned upon the platform, they are inclined toward the tree and the base of the ladder is stably locked with respect to the platform.

The pickers then ascend the ladders and by hooking one leg through the rungs of the ladder may use both hands to pull or twist fruit from the tree. Immediately upon removal of the fruit it is dropped through the tree branches and onto the collecting cone for automatic delivery to the wagons as previously discussed. Moreover, since the pickers have both hands essentially free a technique known as stripping may be utilized wherein a branch is held with one hand and the fruit is stripped off the limb with the other hand. The speed at which a picker may remove fruit in this manner is goverend by the individual dexterity of the picker, but it will readily be realized that by utilizing both hands and merely permitting the fruit to drop from its hanging posture upon a tree limb, rather than holding onto a tree limb with one hand for stability, severing fruit with the other hand and dropping the fruit into a sack, comprises a truly significant advantage in terms of speed and ease of removing fruit from the tree.

As previously discussed, while it is realized that dropping of the fruit through the branches and onto the collecting surface may occasion some degree of bruising, this is a minimal consideration with juice fruit in that the fruit is processed almost immediately upon picking.

Once a tree has been cleaned of its fruit, the operators may descend the ladders and walk onto the frame 76. The flexible sheet may then be retracted on the spring loaded rollers and the conveyors may be mechanically raised and pivoted adjacent the mobile frame for transportation. The next step comprises mechanically translating the arcuate platform 74 above the truck body and then telescoping the first arcuate platform 72 with respect to the arcuate guide. The mobile units 16 and 18 may then move to a succeeding tree where the foregoing steps may be repeated. When the wagons 40 and 50 are filled they may be detached from the mobile units and pulled to a central collection location in the orchard and empty wagons attached to the mobile units for sustained operation.

SUMMARY OF THE MAJOR ADVANTAGES OF THE INVENTION

It will be appreciated from the foregoing that the subject method and apparatus for facilitating the harvesting of fruit from fruit trees constitutes a material advance in the art of picking fruit for the juice market in terms of the most critical parameter of speed at which the fruit may be removed from the trees.

Further, the subject method and apparatus for harvesting fruit from fruit trees provides a system which does not damage the trees during harvesting, eliminates the possibility of collecting rotten fruit and insures the harvesting of all of the fruit in the tree.

Another significant advantage of the subject method and apparatus is the fact that the laborious character of handling an individual ladder upon the ground has been removed so that women may now be added to the picking labor force. In a similar vein the subject ladder assembly is entirely stable and safe so that pickers who were previously afraid to scale ladders in order to remove fruit from tall seedling trees should have no such reservation with respect to use of the subject invention.

Since the fruit may be dropped where it is picked and automatically collected and transported away from the tree, both of the picker's hands are free to remove the fruit and the heavy weighty sacks previously carried are no longer necessary.

In view of the fact that the subject assembly takes much of the tiring labor out of the picking operation, two shifts may work around the clock so that fruit may be readily removed from the trees. In this connection, since the units are provided with electric generating equipment, lighting systems may be mounted upon the mobile units so that night picking becomes a practical reality.

A further significant advantage of the subject invention is the provision for a method and apparatus for retracting and extending platform, collecting and conveyor assemblies adjacent to and beneath the fruit bearing trees. The automated character of this extension and retraction permits the pickers to rest momentarily while the units are being repositioned and without expending their time and energy in positioning bulky and heavy equipment. Further, the units can be conveniently transported between dense groves in the retracted position and further can be made to meet highway transportation requirements.

Although the invention has been described with reference to preferred embodiments, it will be appreciated by those skilled in the art that additions, deletions, modifications, substitutions and other changes not specifically described may be made which will fall within the purview of the appended claims.

What is claimed is:

1. Apparatus for facilitating the harvesting of fruit from fruit trees comprising:
   support means operably positionable adjacent to a fruit tree for facilitating the removal and harvesting of fruit from the tree, said support means including
      a first arcuate platform means operably positionable adjacent the fruit tree, and
      a second arcuate platform means, operably positionable adjacent the fruit tree,
      said first and second arcuate platform means forming, when operably positioned adjacent the fruit tree, a generally semicircular platform partially surrounding the fruit tree;
   conveyor means connected, at a first end thereof remote from the fruit tree, to said support means and operably positionable at a second end thereof adjacent the base of the fruit tree at a horizontal elevation less than said first and second arcuate platform means for conveying fruit away from the fruit tree; and
   collection means, connected to and operably extendible between said first and second arcuate platform means and said second end of said conveyor means positionable at the base of the tree, for collecting by gravity fruits removed from the fruit tree at said second end of said conveyor means adjacent the base of the fruit tree, said collection means being fashioned with an aperture in a portion thereof above said second end of said conveyor whereby fruit removed from the fruit tree will be transported by gravity over said collection means and into said conveyor means for delivery away from said fruit tree for harvesting.

2. Apparatus for facilitating the harvesting of fruit from fruit trees as defined in claim 1 wherein said support means comprises:
   a generally rectangular mobile frame
   an arcuate guide connected along one side of said frame for telescopingly supporting said first arcuate platform means; and
   transverse rail guide means connected transversely across the long sides of said rectangular frame for translatably supporting said second arcuate platform means.

3. Apparatus for facilitating the harvesting of fruit from fruit trees as defined in claim 2 and further comprising
   means connected to said first arcuate platform for telescoping said first arcuate platform outwardly with respect to said arcuate guide and said mobile frame to a posture adjacent the periphery of a fruit tree to facilitate removal of fruit from the tree and for telescoping said first arcuate platform inwardly with respect to said arcuate guide and said mobile frame to facilitate transportation of said mobile frame.

4. Apparatus for facilitating the harvesting of fruit from fruit trees as defined in claim 2 and further comprising
means connected to said second arcuate platform for translating said second arcuate platform outwardly with respect to the long sides of said generally rectangular mobile frame to a posture adjacent the periphery of a fruit tree to facilitate removal of fruit from the tree and for translating said second arcuate platform inwardly with respect to the long sides of said generally rectangular mobile frame to facilitate transportation of said mobile frame.

5. Apparatus for facilitating the harvesting of fruit from fruit trees as defined in claim 2 and further comprising:
means connected between said mobile frame means and said arcuate and said transverse rail guide means for translatably supporting said arcuate and said transverse rail guide means with respect to said mobile frame, and
means, connected to said means for supporting said arcuate and said transverse rail guide means, for translating said arcuate and said transverse rail guide means outwardly with respect to said mobile frame and inwardly with respect to said mobile frame.

6. Apparatus for faciltating the harvesting of fruit from fruit trees as defined in claim 2 and further comprising:
support means connected to said generally rectangular mobile frame for translating outwardly with respect to said frame to a supporting position beneath said first arcuate platform when said first arcuate platform is telescoped to a posture adjacent the periphery of a fruit tree.

7. Apparatus for facilitating the harvesting of fruit from trees as defined in claim 1 wherein:
said conveyor means is pivotally connected at said first end to said support means for swinging movement about an axis generally perpendicular to a ground surface; and
means connected to said conveyor means for swinging said conveyor means outwardly with respect to said support means to position said second end of said conveyor adjacent the base of a fruit bearing tree and for swinging said conveyor means inwardly with respect to said support means to a position to facilitate transportation of said apparatus for facilitating the harvesting of fruit.

8. Apparatus for facilitating the harvesting of fruit from fruit trees as defined in claim 7 and further comprising:
means connected to said conveyor means for raising and lowering said second end of said conveyor means at a position adjacent the base of fruit tree whereby said second end of said conveyor means may be swung out to the base of a fruit tree by said means for swinging and lowering onto a ground surface adjacent the base of the tree by said means for raising and lowering.

9. Apparatus for facilitating the harvesting of fruit from fruit trees as defined in claim 1 and further comprising:
at least one base means carried by each of said first and second arcuate platform means for adjustable sliding movement upon said arcuate platforms;
ladder means mounted upon each of said base means for facilitating access to fruit on the fruit tree; and
lock means connected to each of said base means for locking said base means against sliding and tilting movement upon said arcuate platform means when a fruit picker is positioned upon said ladder means.

10. Apparatus for facilitating the harvesting of fruit from fruit trees as defined in claim 9 wherein each of said lock means comprises:
first and second arcuate, generally U-shaped, channel means each having a first leg overlaying a top surface of said base means and a second leg overlaying a bottom surface of said arcuate platform, said first channel means extending along a segment of the inner periphery of said arcuate platform and said second channel means extending along a segment of the outer periphery of said arcuate platform;
means for normally biasing said second legs away from contact with the bottom surface of said arcuate platform for permitting sliding adjustment of said base means upon said arcuate platform; and
lever means connected between said ladder means and said first and second arcuate channel means for overcoming said means for biasing when a picker ascends said ladder means to lock said second legs against the bottom surface of said arcuate platform.

11. Apparatus for facilitating the harvesting of fruit from fruit trees as defined in claim 1 wherein said collection means comprises:
a plurality of flexible sheets operably extendible between the inner periphery of said first and second arcuate platform means down to said second end of said conveyor means operably positionable adjacent the base of a fruit tree whereby a generally inverse half cone is deployed beneath the fruit tree so that fruit dropped from the tree may be collected by gravity at the inverse apex of the cone and funnel onto said conveyor means for removal.

12. Apparatus for facilitating the harvesting of fruit from fruit trees comprising:
first semicircular platform means operably positionable above the ground surface adjacent the periphery of a fruit tree;
second semicircular platform means connected to said first semicircular platform means and operably positionable above the ground surface adjacent the periphery of a fruit tree, said first and second semicircular platform means being operable to essentially surround the periphery of the fruit tree;
said first semicircular platform means and said second semicircular platform means including means for supporting at least one fruit picker above the ground surface;
conveyor means having a first end operably positionable outwardly from the periphery of said first and second semicircular platform means and a second end operably positionable beneath said platform means to the base of the fruit tree; and
collection means extending from between the inner periphery of said first and second semicircular platform means and the second end of said conveyor means at the base of the fruit tree, said collection means being provided with an aperture above said second end of said conveyor means whereby fruit dropped into said collection means will be collected and directed onto the second end of said conveyor means for delivering away from said fruit tree and harvesting.

13. Apparatus for facilitating the harvesting of fruit from fruit trees as defined in claim 12 and further comprising
mobile support means connected to each of said first and second semicircular platform means for transporting said platform means.

14. Apparatus for facilitating harvesting of fruit from fruit trees as defined in claim 13 wherein said collection means comprises:
a plurality of flexible sheets extendible from the inner periphery of said first and second arcuate platform means down to said conveyor means to form a generally inverted cone beneath the fruit tree to collect fruit dropped into the cone and deposit the fruit onto the second end of said conveyor means for removal.

15. An apparatus for facilitating the harvesting of fruit from successive fruit trees arranged in spaced relation in a row comprising:
complemental right and left hand mobile units movable successively into substantial alignment on opposite sides of each fruit tree in the row,
the right hand mobile unit carrying retractable means for forming a right hand generally semicircular platform and the left hand mobile unit carrying retractable means for forming a left hand generally semicircular platform,
means on the right and left hand mobile units to extend and retract the respective semicircular platform forming means toward and away from a selected fruit tree with said semicircular platform forming means conjointly dimensioned to provide when extended a substantially continuous generally circular platform to substantially encircle the outer circumference of the fruit bearing portion of a fruit tree,
right and left hand retractable conveyor means connected to said right and left hand mobile units respectively and extendible at one end therefrom outwardly to the base of the fruit tree;
right and left hand retractable fruit collecting flexible sheets respectively carried by said right and left hand semicircular platforms and extendible therefrom downwardly and inwardly toward the trunk of the tree, an aperture fashioned within each of said right and left hand retractable fruit collecting flexible sheets for permitting fruit collected upon said flexible sheets to drop onto said right and left hand retractable conveyor means;
means for extending and retracting said fruit collecting flexible sheets to and from an extended cooperative relationship in which said sheets receive fruit dropped from any point within the circumference of the fruit bearing portion of the tree;
said right and left hand semicircular platform forming means and said right and left hand collecting sheets and said right and left hand conveyor means when in retracted position on the respective right and left hand mobile units being independently transportable to a position in substantial alignment on opposite sides of a succeeding tree in the row.

16. A method for facilitating the harvesting of fruit from fruit trees comprising the steps of:
positioning a support means adjacent to a fruit tree, including the steps of,
positioning a first arcuate platform means above the ground surface adjacent the fruit tree, and
positioning a second arcuate platform means above the ground surface adjacent the fruit tree,
said steps of positioning said first and second arcuate platform means being operable to form a generally semicircular platform partially surrounding the fruit tree;
with a first end of a conveyor means connected to the support means extending a second end of the conveyor means to the base of the fruit tree generally adjacent the ground surface;
deploying collection means between the inner periphery of the first and second arcuate platform means and the second end of the conveyor means said collection means having an aperture therein above the second end of the conveyor means to provide a means to collect fruit dropped from the fruit tree for feeding onto the conveyor means for harvesting.

17. A method for facilitating the harvesting of fruit from fruit trees as defined in claim 16 wherein said steps of positioning the arcuate platform means comprises:
telescoping the first arcuate platform means upon arcuate guide means from a position adjacent the support means to a position adjacent the periphery of the fruit tree; and
translating the second arcuate platform means upon transverse rail guide means from a position adjacent the support means to a position adjacent the periphery of the fruit tree.

18. A method for facilitating the harvesting of fruit from fruit trees as defined in claim 17 and further comprising the steps of:
translating said arcuate and said transverse rail guide means outwardly with respect to said support means and inwardly with respect to said support means for adjusting the position of the first and second arcuate platform means with respect to the periphery of the fruit tree.

19. A method for facilitating the harvesting of fruit from fruit trees as defined in claim 16 wherein said step of extending comprises:
swinging the conveyor means about a generally vertical axis at the first end of the conveyor to extend the second end of the conveyor against the base of the fruit tree.

20. A method for facilitating the harvesting of fruit from fruit trees as defined in claim 19 and further comprising, following said step of swinging, the step of:
lowering the second end of the conveyor means onto the ground surface at the base of the fruit tree.

21. A method for facilitating the harvesting of fruit from fruit trees as defined in claim 16 wherein said step of deploying comprises:
extending flexible sheet segment between the inner periphery of the arcuate platform means above the ground surface and the second end of the conveyor means generally at the ground surface to form a generally downwardly directed half cone between the arcuate platform means and the second end of the conveyor adjacent the base of the fruit tree.

22. A method for facilitating the harvesting of fruit from fruit trees arranged in spaced relation in a row comprising the steps of:
- positioning complemental right and left hand mobile units into substantial opposing alignment on opposite sides of a fruit tree;
- extending from said mobile units retractable right and left hand generally semicircular platforms to essentially encircle the outer circumference of the fruit tree;
- extending right and left hand conveyor means from said mobile units to the base of the fruit tree;
- extending complemental semicircular right and left hand fruit receiving flexible sheets downwardly and inwardly to said respective right and left hand conveyor means to catch fruit dropped on the complemental flexible sheets from any point within the outer circumference of the fruit trees; and
- when the fruit from the selected tree has been harvested, retracting the complemental fruit receiving flexible sheets, the right and left hand conveyor means, and the right and left hand semicircular platforms back onto the respective right and left hand mobile units for transporting to a succeeding fruit tree in the row.

23. A method for facilitating the harvesting of fruit from fruit trees as defined in claim 22 wherein said step of extending said right and left hand semicircular platforms comprises for each platform:
- telescoping a first arcuate platform away from said mobile unit; and
- translating a second arcuate platform away from said mobile unit, said first and second arcuate platforms when fully extended operably forming a generally continuous semicircular platform at the outer circumference of the fruit tree.

24. A method for facilitating the harvesting of fruit from fruit trees as defined in claim 22 wherein said step of extending right and left hand conveyor means comprises for each conveyor:
- swinging the conveyor means away from a mobile unit to a posture wherein one end thereof is positioned at the base of the fruit tree; and
- lowering the one end of the conveyor adjacent the base of the fruit tree onto the ground surface at the base of the tree.

* * * * *